Patented June 13, 1933

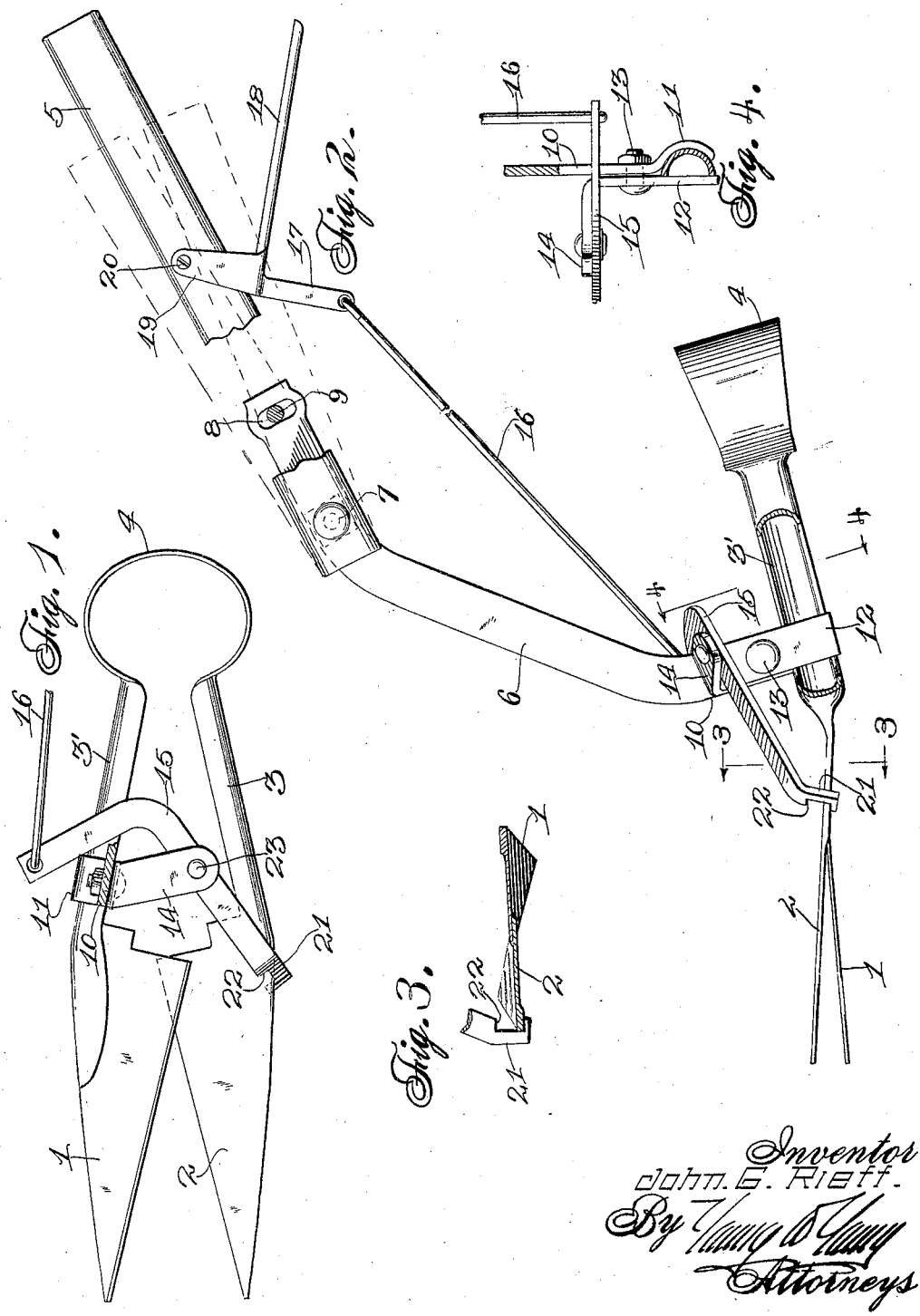

1,913,958

UNITED STATES PATENT OFFICE

JOHN G. RIEFF, OF LONDON, WISCONSIN

TRIMMING IMPLEMENT

Application filed March 23, 1931. Serial No. 524,642.

This invention relates to trimming implements and more particularly to such implements which are adapted to be used for trimming grass, hedges, shrubbery, and the like. One of the objects of the present invention is the provision of a novel holder and operating means which can be attached to any well known type of pruning or trimming shears on the market at the present time, and includes means for normally maintaining the cutting edges of the shears in intimate contact so as to assure a positive, even cut.

Another object of the present invention is the provision of an implement which includes a holder, together with manual operating mechanism for supporting and operating a pair of trimming shears of the ordinary type, wherein the operating mechanism engages one of the blades, not only for actuating the same, but for also maintaining the same in intimate contact with the other blade to assure a positive cutting contact of the two blades.

Another object of the present invention is the provision of a trimming implement which includes a handle having a supporting arm at one end thereof, adapted to be clamped to one handle portion of a pair of trimming shears, while an actuating arm is pivotally and adjustably mounted relative to the clamping arm and adapted to engage the other blade of the shears whereby to maintain the two blades in intimate contact during the operation.

With the above and other objects in view, the invention consists in the novel features of construction, the combination and arrangement of parts hereinafter more fully set forth, pointed out in the claim and shown in the accompanying drawing wherein:

Figure 1 is a plan view with the handle removed, illustrating the application of the shears to the supporting arm and actuating arm;

Figure 2 is a side elevation with portions thereof broken away and illustrated in cross section;

Figure 3 is a detailed section on the line 3—3 of Figure 2; and,

Figure 4 is a detailed section on the line 4—4 of Figure 2.

In the construction of trimming shears of this character, the two blades 1 and 2 are each provided with handle portions 3 and 3' which are arcuate in cross section, as illustrated in Figure 4, and the outer ends of the handle portions are connected by means of the usual spring loop 4 which normally urges the blades 1 and 2 away from each other.

In carrying out the main feature of my invention, I provide a handle member 5 and attached to the outer end of this handle member is an arm 6. The inner end of the arm is arranged substantially parallel with the outer end of the handle and secured thereto by means of a bolt 7. The arm is provided with a transverse slot 8 receiving a bolt 9 which passes through the handle and through the slot to permit adjustable movement of the arm 6 relative to the handle.

The downturned end 10 of the arm is provided with a curved portion 11 adapted to conform to the outer curvature of the handle 3', as shown in Figure 4. Arranged upon the opposite side of the handle 3' from the curved seat 11 is a clamping plate 12 which bridges the inner side of the handle 3' as shown in Figure 4, and is connected to the end 10 of arm 6 by means of the bolt 13.

The upper end of plate 12 is disposed at right angles to the body of the plate and on a tangent thereto, as shown in Figure 2, to form a supporting bracket 14 for the bell crank 15. The short end of the bell crank 15 is pivotally connected to an actuating rod 16 which extends inwardly of the handle and is connected to an arm 17 on the pivoted lever 18. The lever 18 is provided with spaced apertured ears 19 adapted to be arranged upon opposite sides of the handle 5 and connected thereto by means of a transverse bolt 20. The long end of the bell crank 15 which is pivoted to the bracket 14 has an angularly disposed outer end portion 21, provided with a longitudinal recess 22 adapted to receive the outer slanting edge of the cutting blade 2. At this point, I wish to call attention to the fact that the blade 1 will be hereinafter known as the stationary blade, as it is connected directly to the outer end of arm 6 carried by the handle 5. However, the angle of this blade 1 can be adjusted relative to the handle or staff 5 through the medium of the slot 8.

Due to the mounting of the bell crank 15, the outer wall of the recess 22 normally engages the lower or outer face of the blade 2 and urges this blade toward the lower or outer face of blade 1 and at the same time, by rocking the bell crank 15 on its pivot point 23, the blade 2 will be urged toward the blade 1. This movement is carried out by urging the lever 18 toward the handle member 5, rocking arm 17 and exerting a pull on the rod 16. It will be apparent that the two blades 1 and 2 will always be maintained in intimate contact during their actuation, so as not only to assure a positive, even cut on the blades, but to provide what is known as a self-sharpening movement as the two edges are always in intimate contact.

Should the blade 2 become loose relative to the blade 1, the clamping plate 12 can be laterally adjusted on the bolt 13, so as to move the bracket 14 for engaging the outer wall of recess 22 with the outer face of blade 2, whereby the blade 2 may be readily maintained in engagement with blade 1.

Due to the relative adjustment of plate 12 and arm 6, the shears are not only mounted for adjustment relative to the handle or staff 5, but the actuating bell crank 15 is also adjustable so as to maintain the two blades in intimate contact at all times.

While I have described and illustrated a pair of shears which is well known on the market in connection with my improved holder and actuating member, it will be apparent that any type of shears may be suspended which will fit the holder and be actuated in a similar manner.

It will be noted that the angular position of the handle relative to the cutting shears will enable the operator to reach beneath low shrubbery and low hanging trees for trimming the parts beneath the same where it will be practically impossible for the operator to position himself beneath the parts to be cut. The device is comparatively simple in construction and will prove very efficient for the purpose intended.

While I have shown and described the preferred embodiment of my invention, it will be apparent from the foregoing that slight changes may be made in the construction when putting the invention into practice without departing from the spirit of the same or the scope of the appended claim.

I claim:

In combination with a pair of shears including a pair of cutting blades, handles therefor, and means connecting the handles together normally urging the blades away from one another, of means for operating the blades at a point distant from the shears including a depending arm having an offset lower end, a hand grip connected with the upper end of the arm, the lower end of the arm engaging one face of one handle of the shears, an angle bracket including a pair of angularly related legs, one of said legs engaging the other face of the mentioned handle with the other leg extending toward the other handle, means adjustably connecting the first leg and the arm together, said arm and angle bracket being movable longitudinally of the handle to dispose the second mentioned leg of the angle bracket different distances away from the shear blades, a bell crank rockably mounted on the outer end of the second mentioned leg extending toward one cutting blade and having a depending notched extension receiving the outer edge of the last mentioned blade, an operating lever pivotally connected with the hand grip, and a rod operatively connecting the lever and the bell crank together.

In testimony that I claim the foregoing I have hereunto set my hand at London, in the county of Dane and State of Wisconsin.

JOHN G. RIEFF.